Oct. 6, 1925.
L. M. POUGET
1,556,026
APPARATUS FOR USE IN MAKING EXTRACTS, INFUSIONS, DECOCTIONS, AND THE LIKE
Filed June 30, 1923
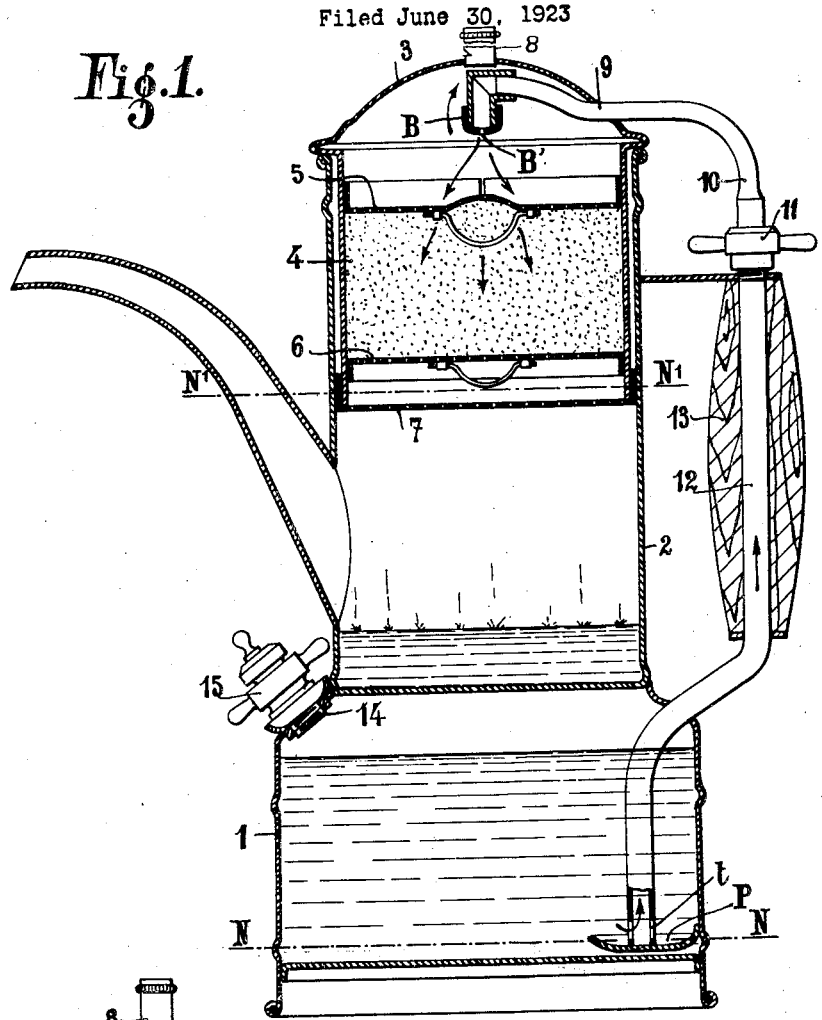
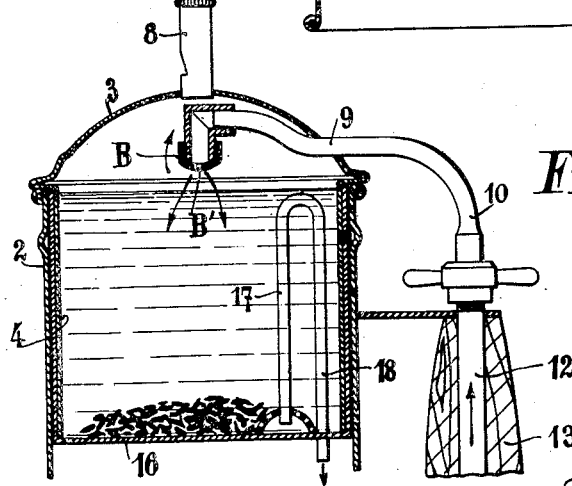
Inventor
Louis Marcel Pouget
by R. Singer
Atty Patented Oct. 6, 1925.

1,556,026

UNITED STATES PATENT OFFICE.

LOUIS MARCEL POUGET, OF VALLIERE, FRANCE.

APPARATUS FOR USE IN MAKING EXTRACTS, INFUSIONS, DECOCTIONS, AND THE LIKE.

Application filed June 30, 1923. Serial No. 648,756. REISSUED

*To all whom it may concern:*

Be it known that I, LOUIS MARCEL POUGET, a citizen of France, and a resident of Valliere, in the Department de la Creuse, France, have invented some new and useful Improvements in or Relating to Apparatus for Use in Making Extracts, Infusions, Decoctions, and the like, of which the following is a specification.

The invention relates to apparatus for automatic infusion of coffee, tea or any other material and its object is to provide an apparatus permitting the production of any such infusion in very efficient manner, means being provided to indicate that the infusion is complete.

In order to attain this object, I provide a cafetière or the like comprising a boiler and a filter in which the water intended to effect the infusion with the ground coffee or the like circulates in a closed circuit in accordance with thermo-siphonic action. The boiling water is thus raised by thermo-siphonic action and flows onto the ground coffee contained in the upper part of a filter receptacle or onto the material to be infused. After the necessary quantity of water has been used, the residual water still contained in the boiler produces steam which is utilized to actuate a whistle which gives a warning that the infusion is complete.

In order that the invention may be clearly understood reference is made to the accompanying drawings, which show a construction of apparatus in accordance with the present invention.

Figure 1 is a vertical section of an arrangement of apparatus in accordance with the present invention.

Figure 2 is an accessory detail which is used to replace the filter for use in making infusions of tea and other material.

Referring to Figure 1 which shows the apparatus for use in making an infusion of coffee, tea or the like, the base of the apparatus comprises a receptacle 1 which contains water and which is completely closed and above which is superposed an extended receptacle 2 to contain the infused coffee.

A cover 3 is provided on the top of the receptacle 2 and the said cover is extended to form an interior box or casing 4 for use in filtering the coffee when the perforated plates 5, 6 and 7 have been placed in position.

The cover 3 is provided with a whistle 8 and a water inlet 9 having an outlet nozzle B and a small opening therefrom B' which controls the supply of water to the receptacle 2. The water inlet 9 is connected to a tube 10, the latter being connected by a coupling 11 to a tube 12 which extends downwards and into the receptacle 1 and nearly to the bottom thereof. The tube 12 is provided with a handle 13 by which the apparatus may be manipulated.

The tube 12 has for its object to permit the boiling water from the receptacle 11 rising therein and escaping under thermo-siphonic action so that the said water when boiling ascends the tube 12, tube 10, tube 9 and escapes through the outlet opening B' onto the ground coffee contained in the upper filtering receptacle 4. A plate F is fixed at the lower end of the tube 12 which is provided adjacent the said plate P with openings T which prevent the escape of steam into the tube 12 before the necessary quantity of liquid has been used. That is to say, before all the water contained above the level N—N has been used.

The filtering receptacle, as will be readily seen, must be separated from the body of the apparatus when it is desired to clean the said receptacle or to supply thereto a new quantity of ground coffee or other desired material.

The replenishing of the receptacle is effected by holding the cover in a reverse position and by first positioning the perforated plate 5 above which and below the whistle 8 is a space, the said plate also serving as an abutment to the ground coffee. The latter being placed on the perforated plate 5 it is compressed by the plate 6. In case the latter drops when the filtering receptacle is placed in the apparatus and in order to retain the ground coffee in position, the end of the filtering receptacle 4 is provided with a perforated plate 7 which acts as a plug or cap. The plate 7 may be provided with a suitable filtering sheet so as to effect perfect filtration.

When the coffee is infused, the parts of the apparatus are in the position shown in the drawing, the filtering device being in its proper place and the tube 10 connected to the tube 11 which as previously stated extends into the water receptacle into which water can be introduced through the stoppered opening 14.

The stopper for the opening 14 comprises a screwdown plug 15 which is provided with a safety valve.

It is sufficient then to place the receptacle on the fire without any other precaution, the infusion being effected automatically as seen as the water reaches boiling point. As soon as this infusion is effected warning thereof will be given by the whistle 8, thus indicating that the infusion operation is complete.

The action of the apparatus is as follows: The water in the receptacle 1 on being heated rises in the tube 12 as in the thermosiphon. As this heat gradually increases the steam which is formed at the surface increases in pressure above the level of the water and the water rises further in the tube 12 and diffuses slowly through the nozzle B and the outlet B' therein onto the ground coffee which swells. When boiling takes place and pressure increases, the tube 10 traversed by the boiling water passes through the tube 12, tube 10, tube 9 and is sprayed onto the coffee, the infusion passing successively through the plates 5, 6 and 7 and falling into the receptacle 2 in which there is a high temperature during the infusion period.

When the water from the receptacle 1 falls to the level N—N the supply of water in the filtering receptacle is stopped because the tube 12 is no longer under the level of the water. The infused coffee reaches the level N'—N' for example and the infusion is then terminated. But as the apparatus remains on the fire or on the heating device until infusion is complete, there is sufficient residual water in the receptacle 1 to prevent burning. It is essential, however, that the action of the fire on this small volume of water should be stopped as soon as possible. With this object in view and as infusion is complete, the steam which is formed in the receptacle 1 passes into the tube 12 and is delivered to the upper part of the filtering receptacle 4. But here the layer of coffee is opposed to the escape of the steam and is therefore compelled to escape through the whistle 8, thus giving a warning that the infusion operation is complete.

It may be remarked also that the level of the infusion in the receptacle 2 extends above the perforated plate 7 and that it forms a hydraulic seal which opposes any passage of the steam through the layer of coffee.

The apparatus may be used for the infusion of tea or other desired material, its action being practically the same in all cases.

For this purpose it will be sufficient to raise the three perforated plates 5, 6 and 7 and to substitute therefor a receptacle such as is shown in Fig. 2.

The receptacle 16 is introduced into the filtering receptacle 4. It is provided interiorly with a siphon fixed to the bottom thereof. The siphon has one of its limbs 17 in communication with the interior of the receptacle 4, the other limb 18 passing through the bottom of the receptacle 16 and into the water in the receptacle 1, although not necessarily extending to the bottom of the said receptacle.

This siphonic action is used although in this application the liquid cannot escape and it must remain for the infusion of the tea. One understands therefore that the tea or other material is placed in the receptacle 16 and that the boiling water is admitted by the tube 9 and remains in the receptacle.

As the water gradually rises in this receptacle it falls through the limb 17 of the siphon and on reaching the bend of the siphon it flows through the limb 18 into the receptacle 2 of the apparatus.

Siphoning is effected during the period of escape through the tube 9 and the nozzle B and outlet B' therefrom. When this escape stops the steam acts on the whistle as previously described and the contents of the receptacle 4 continue to flow through the siphon. Here, as in the cafetière construction, infusion is effected during all the period of escape which gives a beverage with all the qualities of the material retained therein.

The apparatus described for the infusion of coffee and tea may be used for the infusion of any other material and it is not limited in its dimensions nor in its details nor in the material employed.

What I claim is:

A boiler, a receptacle detachably mounted therein, a filtering receptacle in the first named receptacle and having a cover which also forms the cover of said first named receptacle, a tube comprising two members, one leading from the bottom of the boiler and the other leading from the first to the upper portion of the filtering receptacle and including a portion arranged without the boiler and first named receptacle and also including a coupling joint, the said members being respectively attached to the boiler and to the first named receptacle, and a handle having a bore through which that portion of the first named tubular member which is arranged with the boiler extends.

In witness whereof I affix my signature.

LOUIS MARCEL POUGET.